(12) United States Patent
Sardesai et al.

(10) Patent No.: US 11,818,576 B2
(45) Date of Patent: Nov. 14, 2023

(54) SYSTEMS AND METHODS FOR LOW LATENCY CLOUD COMPUTING FOR MOBILE APPLICATIONS

(71) Applicant: Verizon Patent and Licensing Inc., Arlington, VA (US)

(72) Inventors: Ashish Sardesai, Ashburn, VA (US); Saravanan Mallesan, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 741 days.

(21) Appl. No.: 16/592,496

(22) Filed: Oct. 3, 2019

(65) Prior Publication Data

US 2021/0105624 A1 Apr. 8, 2021

(51) Int. Cl.
| | |
|---|---|
| *H04W 12/088* | (2021.01) |
| *H04L 67/10* | (2022.01) |
| *G06F 8/61* | (2018.01) |
| *H04W 12/06* | (2021.01) |
| *H04W 4/50* | (2018.01) |
| *H04W 84/04* | (2009.01) |
| *H04W 72/542* | (2023.01) |

(52) U.S. Cl.
CPC ............ *H04W 12/088* (2021.01); *G06F 8/61* (2013.01); *H04L 67/10* (2013.01); *H04W 4/50* (2018.02); *H04W 12/06* (2013.01); *H04W 72/542* (2023.01); *H04W 84/042* (2013.01)

(58) Field of Classification Search
CPC ....... H04L 67/12; H04L 67/125; H04L 67/10; H04L 67/63; H04L 67/60; H04L 67/1095; H04L 67/141; H04L 67/14; H04L 63/10; H04L 47/70; H04L 47/765; H04L 47/824; H04L 41/5051; H04L 65/1026; H04L 65/1023; H04L 65/102
See application file for complete search history.

(56) References Cited

U.S. PATENT DOCUMENTS

| | | | |
|---|---|---|---|
| 9,072,042 B2* | 6/2015 | Berg | H04W 12/04 |
| 9,112,792 B2* | 8/2015 | Berg | H04W 8/082 |
| 9,313,798 B2* | 4/2016 | Kuo | H04B 7/26 |
| 9,544,353 B2* | 1/2017 | Alam | H04L 67/025 |
| 10,567,937 B2* | 2/2020 | Cuevas Ramirez | G06F 9/5083 |

(Continued)

FOREIGN PATENT DOCUMENTS

| | | | | |
|---|---|---|---|---|
| EP | 3116198 A1 * | 1/2017 | | |
| WO | WO-2018215046 A1 * | 11/2018 | ......... | H04L 67/1021 |
| WO | WO-2020239195 A1 * | 12/2020 | ......... | H04L 41/5051 |

*Primary Examiner* — Tae K Kim (57) ABSTRACT

A device may receive, from a user equipment (UE), a request to allocate one or more computing resources for an application executing on the UE. The device may be associated with an edge node of a mobile network and the UE may be within a coverage area associated with the edge node. The device may receive a remote execution file package that is associated with code to be executed using the one or more computing resources. The device may assign the one or more computing resources for the application. The device may cause at least one of installation of the code for execution by the one or more computing resources, or execution of the code using the one or more computing resources. The device may transmit a response that provides an indication that the one or more computing resources have been allocated for the application.

20 Claims, 6 Drawing Sheets

(56) References Cited

U.S. PATENT DOCUMENTS

| | | | |
|---|---|---|---|
| 10,819,828 B2* | 10/2020 | Rasanen | H04L 45/38 |
| 11,134,127 B2* | 9/2021 | Lee | H04L 67/56 |
| 2013/0070618 A1* | 3/2013 | Anthony, Jr. | H04L 43/0817 |
| | | | 370/252 |
| 2013/0160085 A1* | 6/2013 | Berg | H04W 12/04 |
| | | | 726/4 |
| 2013/0208674 A1* | 8/2013 | Berg | H04W 12/04 |
| | | | 370/329 |
| 2013/0265868 A1* | 10/2013 | Berg | H04W 4/60 |
| | | | 370/228 |
| 2013/0265936 A1* | 10/2013 | Berg | H04L 45/22 |
| | | | 370/328 |
| 2014/0022985 A1* | 1/2014 | Kalmbach | H04W 88/08 |
| | | | 370/328 |
| 2014/0038583 A1* | 2/2014 | Berg | H04W 4/50 |
| | | | 455/419 |
| 2017/0272365 A1* | 9/2017 | Wei | H04L 45/302 |
| 2018/0191563 A1* | 7/2018 | Farman | H04W 48/18 |
| 2018/0248787 A1* | 8/2018 | Rajagopal | H04W 28/0215 |
| 2018/0310150 A1* | 10/2018 | Cuevas Ramirez | G06F 8/65 |
| 2019/0020657 A1* | 1/2019 | Egner | H04W 12/009 |
| 2019/0089780 A1* | 3/2019 | Yousaf | G06F 9/45533 |
| 2019/0141610 A1* | 5/2019 | Sabella | G06F 9/45533 |
| 2019/0208465 A1* | 7/2019 | Mihály | H04W 8/08 |
| 2019/0222518 A1* | 7/2019 | Bernat | H04L 41/5009 |
| 2019/0356743 A1* | 11/2019 | Park | H04L 67/61 |
| 2020/0007460 A1* | 1/2020 | Guim Bernat | G06F 9/5077 |
| 2020/0028938 A1* | 1/2020 | Rasanen | H04L 45/38 |
| 2020/0029199 A1* | 1/2020 | Sen | H04L 41/0895 |
| 2020/0036808 A1* | 1/2020 | Yu | H04L 67/10 |
| 2020/0142735 A1* | 5/2020 | Maciocco | H04L 41/5025 |
| 2020/0204603 A1* | 6/2020 | Upadhyaya | H04L 65/80 |
| 2020/0351327 A1* | 11/2020 | Shiell | H04L 67/10 |
| 2020/0359218 A1* | 11/2020 | Lee | H04L 63/0838 |
| 2020/0404069 A1* | 12/2020 | Li | H04W 8/24 |
| 2021/0014733 A1* | 1/2021 | Soliman | H04M 15/64 |
| 2021/0029075 A1* | 1/2021 | Yu | H04L 67/02 |
| 2021/0076250 A1* | 3/2021 | Wang | H04W 28/0221 |
| 2021/0084446 A1* | 3/2021 | Dowlatkhah | H04W 4/029 |

* cited by examiner

SYSTEMS AND METHODS FOR LOW LATENCY CLOUD COMPUTING FOR MOBILE APPLICATIONS

BACKGROUND

A mobile network (or cellular network) is a communication network that facilitates wireless communication. The mobile network is distributed over land areas, which may be referred to as cells, that are served by one or more base stations at fixed locations of the land areas. The one or more base stations provide network coverage within the cells. In some mobile networks, edge computing systems, sometimes referred to as multi-access edge computing (MEC) systems, may enable cloud computing capabilities at an edge of the mobile network. For example, MEC systems may be implemented at the one or more base stations or other edge nodes of the mobile network.

DETAILED DESCRIPTION OF PREFERRED EMBODIMENTS

The following detailed description of example implementations refers to the accompanying drawings. The same reference numbers in different drawings may identify the same or similar elements.

Applications may use cloud computing to offload processing tasks and data storage to a remote pool of shared computing resources. In MEC, a cloud computing environment may be located at an edge of a network in order to facilitate communication between a user equipment (UE) and the cloud computing environment with reduced latency. Typically, a cloud deployment of an application must occur before the UE can access operations of the application via the cloud computing environment. For example, the cloud deployment of the application may involve various orchestration tasks (e.g., operations, administration, management, and/or provisioning tasks) to configure the cloud computing resources for use by the application, such as installation of software particular to the application. These orchestration tasks may be time consuming and use significant computing resources, and may also require significant pre-planning and setup before an application may be available for use by a UE.

Moreover, the UE may establish communications with different MEC systems as the UE moves within different coverage areas of a network. For example, each coverage area of the network may be associated with a respective MEC system. Accordingly, a MEC cloud deployment of an application may occur at each MEC system with which the UE may establish communications in order for the application to be accessible to the UE with low latency as the UE moves within different coverage areas of the network. These multiple cloud deployments consume significant processing resources, memory resources, and/or the like, particularly when the network is associated with thousands or millions of MEC systems.

According to some implementations described herein, an allocation platform enables low latency allocation of cloud computing resources to a UE. In some implementations, the allocation platform may receive a request from a UE to allocate computing resources for an application executing on the UE, and the request may include a remote execution file package associated with the application. The allocation platform may cause execution of code associated with the file package using the computing resources to enable the application to access the computing resources without prior cloud deployment of the application.

In this way, the application executing on the UE may access cloud resources with reduced latency. Accordingly, the allocation platform improves operation of latency-sensitive applications of the UE, thereby improving performance and usability of the UE. Moreover, operations of the application may utilize cloud computing resources on demand, without prior cloud deployment of the application, thereby conserving processing resources, memory resources, and/or the like, that may be wasted by numerous cloud deployments of the application, and decreasing the time required to have applications obtain access to edge cloud systems.

Figure 1A:
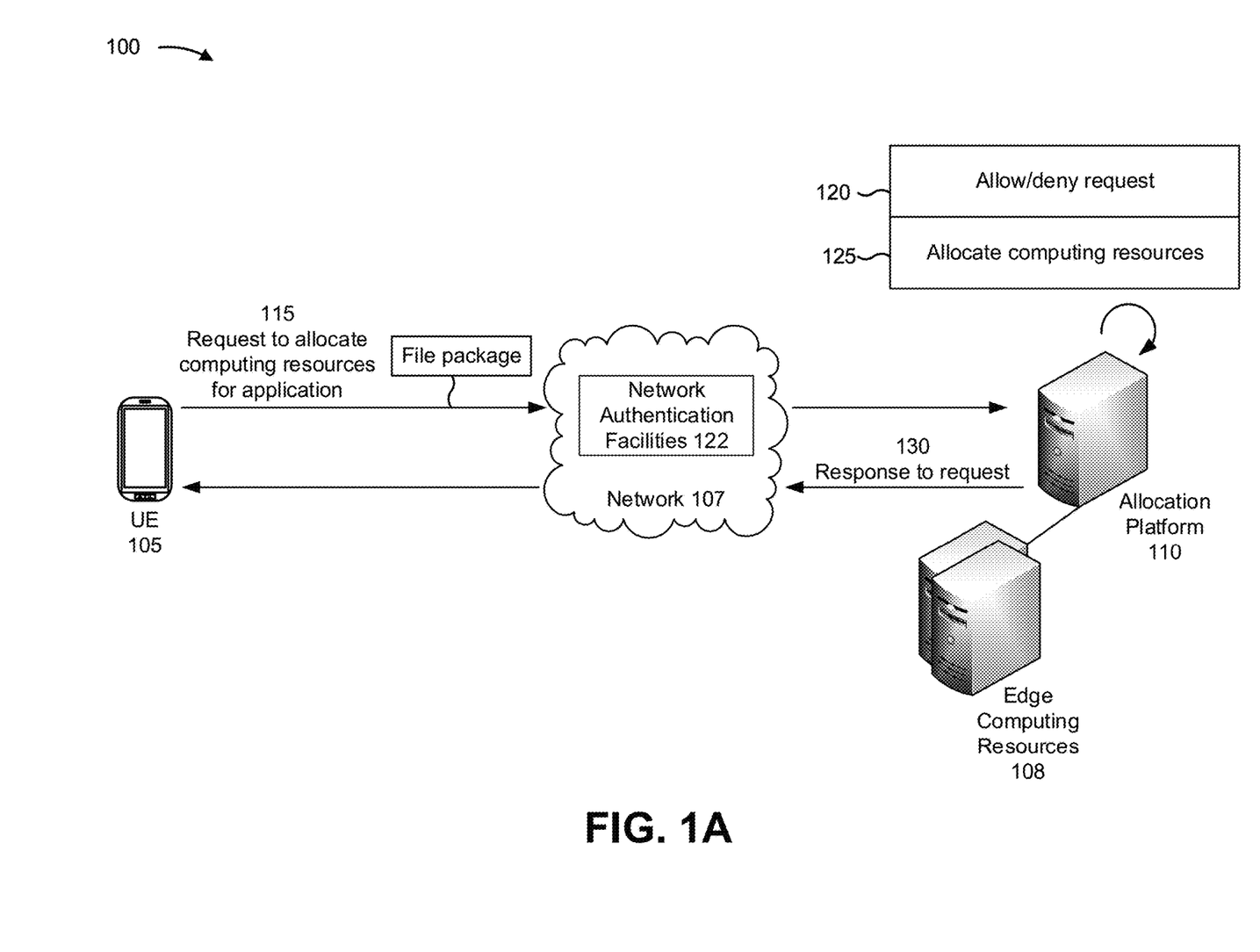
FIGS. 1A-1C are diagrams of example implementations described herein.
Figure 1B:
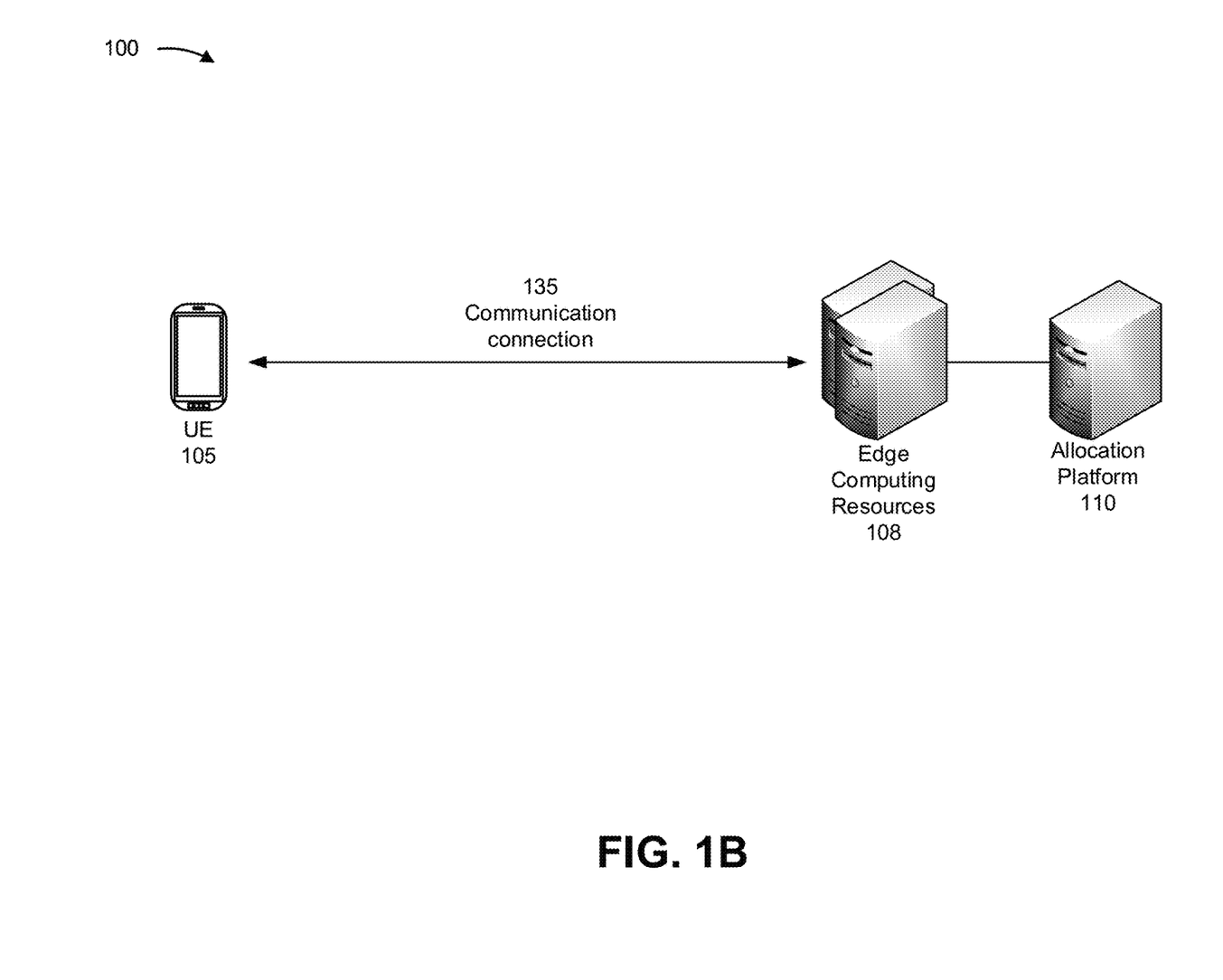
Figure 1C:
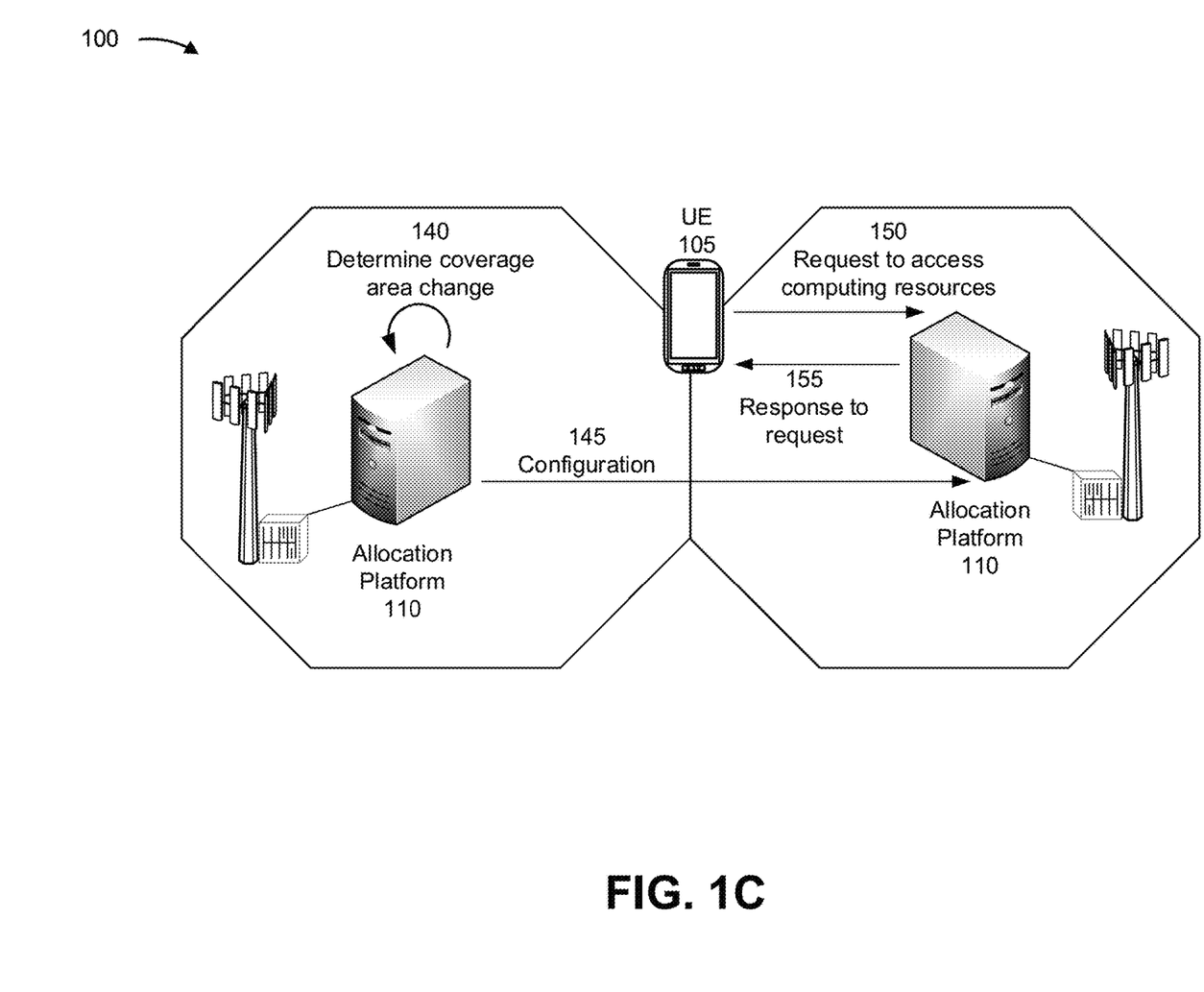

FIGS. 1A-1C are diagrams of one or more example implementations 100 described herein. As shown in FIGS. 1A-1C, example implementation(s) 100 may include a UE 105, a network 107, edge computing resources 108, and an allocation platform 110. The UE 105 may be a mobile device, a smart phone, a smart device, an internet of things (IoT) device, a wearable communications device, and/or the like. The UE 105 may communicate using the network 107, which may provide connectivity with devices on network 107 as well as devices connected to other networks (e.g., the Internet) connected to network 107. Network 107 may be implemented as a mobile network (e.g., a 5G network), a fixed network, or a combination of both.

In some implementations, the UE 105 may execute one or more applications, services, and/or the like, that utilize processing resources, storage resources, and/or the like, of the UE 105. References herein to an application of the UE 105 may include, and are equally applicable to, a service of the UE 105. In some implementations, an application may be a mobile application that causes the UE 105 to transmit or receive communications via network 107. For example, the application may be an application that utilizes artificial intelligence and/or machine learning, a virtual reality application, an augmented reality application, a gaming application, and/or the like.

The allocation platform 110 may be one or more computing devices, one or more servers, and/or the like that facilitate cloud computing for the UE 105 (e.g., for an application executing on the UE 105). In some implementations, the allocation platform 110 may include one or more devices that facilitate edge computing for the UE 105. That is, the allocation platform 110 may be used to facilitate use by UE 105 of computing resources 108 located at an edge of network 107. For example, the edge computing resources 108 may be associated with one or more base stations, one or more aggregation points, or one or more other nodes of a mobile network or other edge nodes of network 107. In some implementations, allocation platform 110 may be included as part of edge computing resources 108, as separate from edge computing resources 108, or partially included in edge computing resources 108. Allocation platform 110 may be implemented in a distributed fashion such that components of allocation platform 110 are included in multiple edge computing resources 108 and/or multiple other computing resources.

In some implementations, the allocation platform 110 may be associated with a MEC system of network 107. The MEC system may implement a cloud computing environment that provides a pool of shared computing resources to UEs. The computing resources may be associated with one or more computing devices, one or more server devices, one or more storage devices, and/or the like. As noted above, allocation platform 110 and edge computing resources 108 may be co-located or otherwise share computing resources.

In some implementations, the allocation platform 110 may be associated with a coverage area of an access network of network 107. For example, where network 107 includes a mobile network, the allocation platform 110 may be associated with a coverage area of one or more base stations of a radio access network (RAN) of network 107. The allocation platform 110 may facilitate use of edge computing resources 108 for the UE 105 when the UE 105 is within a coverage area associated with edge computing resources 108 and/or the allocation platform 110. Accordingly, when the UE 105 exits the coverage area associated with the edge computing resources 108 and/or allocation platform 110 and enters another coverage area, another set of edge computing resources 108 and/or allocation platform 110 associated with the other coverage area may be available to facilitate use of edge computing resources for the UE 105.

In some implementations, the allocation platform 110 may implement a service (e.g., a web service) for facilitating edge computing. For example, the allocation platform 110 may expose an application programming interface (API), such as a Representational State Transfer (REST) API, and the UE 105 may provide requests to the allocation platform 110 via the API, and the allocation platform 110 may provide responses to the UE 105 via the API.

In some implementations, the service of the allocation platform 110 may be reachable via an address (e.g., an Internet Protocol (IP) address). For example, the service of the allocation platform 110 may be reachable via an anycast address (e.g., an anycast IP address). Accordingly, the service of another allocation platform 110 (e.g., another allocation platform 110 associated with another coverage area) may be reachable via the same address (e.g., the same anycast IP address) as the allocation platform 110. In such cases, a request of the UE 105 to an address associated with the allocation platform 110 and the other allocation platform 110 may be processed by the allocation platform 110 or the other allocation platform 110 based on a location of the UE 105 when making the request.

For example, a request to the address by the UE 105 that is received at a base station, or other node of network 107, may be forwarded by one or more gateways within network 107. In some implementations, a gateway may be implemented by a user plane function (UPF) or packet gateway (PGW) of the network 107. In some implementations, a gateway may receive the request to the address and forward the request according to an uplink classifier (e.g., an uplink classifier of the UPF that includes rules for traffic forwarding). For example, the gateway may determine that the address is associated with multiple edge computing endpoints (e.g., multiple allocation platforms 110 associated with different coverage areas of network 107), and forward the request to an endpoint (e.g., one of the multiple allocation platforms 110) according to a location of the UE 105. For example, the request may be forwarded to the allocation platform 110 when the location of the UE 105 is within a coverage area associated with the allocation platform 110. The gateway (e.g., UPF or PGW) may identify a location of the UE 105 according to information provided by a location tracking facility of network 107, such as an access and mobility management function (AMF), a mobility management entity (MME), or similar facility which may track/receive/report on a location of the UE 105 within network 107. For example, location tracking may include identifying a base station, or other node of the access network, with which the UE 105 has established a connection.

As shown in FIG. 1A, and by reference number 115, the UE 105 may transmit, and the allocation platform 110 may receive, a request (e.g., an API request) to allocate one or more computing resources for an application executing on the UE 105. For example, the UE 105 may transmit the request to an anycast address associated with the edge computing service, and the allocation platform 110 may receive the request when the UE 105 is within a coverage area associated with the allocation platform 110. The UE 105 may transmit the request based on a determination that computational tasks (e.g., processing tasks) of the application are more beneficially performed by edge computing resources.

For example, upon execution of the application or upon a particular user interaction with the application, the UE 105 may determine to offload particular computational tasks to edge computing resources. As an example, the UE 105 may determine to offload the computational tasks when a particular operation of the application is triggered, when a current computing resource usage of the application exceeds a threshold value, when an expected computing resource usage of the application exceeds a threshold value, when a current total computing resource usage of the UE 105 exceeds a threshold value, when an expected total computing resource usage of the UE 105 exceeds a threshold value, and/or the like. The application executing on UE 105 may also be configured to request edge computing offload for certain portions of the application, and when such edge computing resources are indicated as available, cause the UE 105 to perform offload, as described below.

In some implementations, the request may identify one or more parameters for the computing resources that are to be allocated to the UE 105. In some cases, the request may identify a quantity of computing resources that are to be allocated to the UE 105. For example, the request may indicate a processing, an operating system, a memory, and/or a storage need of the UE 105. As another example, the computing resources may be portioned as units of a particular processing, operating system, memory, and/or storage capability, and the request may indicate a quantity of units. Additionally, or alternatively, the request may identify a type of computing resources that are to be allocated to the UE 105. For example, the request may indicate that the computing resources allocated to the UE 105 are to be associated with one or more central processing units (CPUs), one or more graphics processing units (GPUs), one or more quantum processing units (QPUs), and/or the like.

In some implementations, the request may include an indication that the allocation platform 110 is to respond with confirmation of the availability of the requested computing resources before instantiating the requested computing resources. In such implementations, the UE 105 may send a second request indicating a desire to instantiate the requested computing resources (e.g., after receiving confirmation of the availability of the requested computing resources). In some implementations, the request may be assumed to require a confirmation response, and an indication that the allocation platform 110 is to respond with confirmation is not included in the request. In some implementations, the request may include an indication that the allocation platform 110 is to immediately instantiate the requested computing resources, and the absence of the indication results in a confirmation response. In implementations, when the requested resources are not immediately instantiated in response to the request, the allocation platform 110 may perform a reservation process, whereby the requested computing resources are allocated and reserved awaiting a subsequent request to instantiate the requested computing resources.

In some implementations, the request may include a remote execution file package associated with the application. The file package may be a non-transitory computer-readable medium that provides instructions for one or more operations of the application. For example, the file package may be a binary file, a system image file (e.g., a container, a virtual disk file, a machine image file, and/or the like), an application image file, a collection of interrelated files for interpretation or compilation (e.g., shared libraries, script files, and/or the like) and/or the like. In some implementations, the file package may include an executable file (e.g., a bootstrap executable file) that may provide instructions for retrieval of other files (e.g., another remote execution file package that provides instructions for the one or more operations of the application, a package of scripts or libraries, and/or the like) from a particular location (e.g., a cloud location, a uniform resource locator (URL) location, a uniform resource identifier (URI) location, and/or the like). In some implementations, the file package may include only a URL from which files are to be obtained. In some implementations, the request may include data, associated with the application, that is to be processed using the computing resources according to an execution of the code associated with the file package. In some implementations, the remote execution file package may be provided after the allocation platform 110 has responded with confirmation that the requested resources have been allocated. In some implementations, the remote execution file package may be provided after the requested resources have been instantiated.

In some implementations, the request also may include authentication data (e.g., credentials) associated with the application, the UE 105, and/or a user associated with either. For example, the authentication data may include an identifier of the application and/or a key, a password, and/or the like associated with the application, the UE 105, and/or a user associated with either. In some implementations, the authentication data may be associated with the service implemented by the allocation platform 110. For example, the application, the UE 105, and/or a user associated with either, may have received credentials in association with a previous registration for API access to the service. In some implementations, a portion of the authentication may be done using network authentication facilities. For example, because the UE 105 may already be authenticated in order to communicate over network 107, allocation platform 110 may be permitted to use such authentication to make authorization determinations regarding the request. In some implementations, network 107 exposes an API to network authentication facilities 122 to allow the allocation platform 110 to query for authentication verification, authorization information, and/or policy information regarding the request to use edge computing resources.

As shown by reference number 120, the allocation platform 110 may approve or deny the request by the UE 105 to use edge computing resources. For example, the allocation platform 110 may determine whether the UE 105, the application executing on the UE 105, and/or the user associated with either the UE 105 or the application, is identifiable and authorized to use the computing resources, whether the resources being requested are available for allocation to UE 105, whether any applicable policies prohibit use of edge computing resources 108, and/or the like. In some cases, the allocation platform 110 may determine authorization based on authentication data included in the request, such as user credentials, application credentials, UE credentials, and/or the like. In some implementations, the allocation platform 110 may authenticate the request based on a determination that the UE 105 has been registered on the mobile network associated with the allocation platform 110 (e.g., by using access to information from network authentication facilities 122 to authenticate and determine authorization for access). The allocation platform 110 may refuse the request based on a determination that the application, the UE 105, and/or the user associated with either, is not authorized to use the computing resources, and provide a refusal response to the UE 105.

In some implementations, the authentication data may be associated with the application, and may be universal for the service regardless of the user and/or UE making the request. In other words, the UE 105 may provide the authentication data associated with the application (e.g., in a request) to the allocation platform 110, and the allocation platform 110 may authorize the use of the edge computing resources based on the application authentication data. In some implementations, there may be policies that limit access to the edge computing services based on user/UE types (e.g., certain classes of UE may be prohibited from requesting edge computing services), computing resources available (or expected to be available) at edge computing resources 108, time/day restrictions, and/or the like. Requests that do not comply with an applicable policy may be denied.

In some implementations, prior to determining authorization, the request may arrive at a firewall associated with the allocation platform 110. The firewall may control access to the service implemented by the allocation platform 110. For example, the firewall may close a port (e.g., a port associated with the anycast address) of a device implementing the allocation platform 110 when requests are not to be processed by the allocation platform 110.

As shown by reference number 125, the allocation platform 110 may allocate computing resources for the application (e.g., while the application is executing on the UE 105) based on determining that the application, the UE 105, and/or a user associated with either, is authorized to use the edge computing resources 108. The computing resources may be associated with edge computing resources 108 that include, or are associated with, the allocation platform 110.

The allocation platform 110 may allocate the computing resources according to the request of the UE 105. For example, the allocation platform 110 may allocate a quantity of computing resources identified by the request, a type of computing resources identified by the request, and/or the like. In some implementations, the allocation platform 110 may implement a load balancer that provides a distribution (e.g., an even distribution) of allocated computing resources across a pool of shared computing resources within edge computing resources 108.

In some implementations, the allocation platform 110, when allocating the computing resources for the application, may assign the computing resources to the application. Moreover, the allocation platform 110, when allocating the computing resources for the application, may cause installation of the remote execution file package (if provided) for execution by the computing resources and/or cause execution of the code associated with the remote execution file package using the computing resources. In this way, the allocation platform 110 may cause creation of an application-related instance that includes one or more operations of the application, the application-related instance running within edge computing resources 108. In some cases, such as when the request includes data associated with the application that is to be processed using the computing resources, the allocation platform 110 may provide the data to the computing resources (e.g., to the application-related instance that uses the computing resources).

In some implementations, the allocation platform 110 may assign (e.g., dynamically assign) an address (e.g., an IP address and/or a port number) at which the UE 105 may access the application-related instance on the computing resources. Moreover, the allocation platform 110 may configure a firewall associated with the computing resources to allow the application on the UE 105 to access the application-related instance on the computing resources.

As shown by reference number 130, the allocation platform 110 may transmit (e.g., while the application is executing on the UE 105), and the UE 105 may receive, a response (e.g., an API response) indicating that the computing resources have been allocated to the application. That is, after allocating the computing resources to the application, assigning the address, and/or configuring the firewall, the allocation platform 110 may transmit the response to the UE 105. The response may identify the address at which the UE 105 is to access the application-related instance on the edge computing resources 108. The response may also identify any restrictions associated with usage of the application-related instance (e.g., access rate limiting, processing rate limiting, reservation duration/end, and/or the like).

As shown in FIG. 1B, and by reference number 135, the UE 105 may establish a communication connection to the application-related instance on the computing resources. For example, the UE 105 may connect to the application-related instance on the computing resources using the address (e.g. IP Address/port number) identified by the response. If not previously provided, the UE 105 may provide the remote execution file package to the computing resources 108 for installation and/or execution. The UE 105 may be configured to communicate with the application-related instance, for example, using the assigned address and any expected higher-layer protocols (e.g., HTTP(S)).

The UE 105 may transmit data, associated with the application, for processing by the computing resources. The data associated with the application may be audio data, image data, video data, user data, and/or the like. The computing resources may process the data according to an execution of the code associated with the remote execution file package at the application-related instance. For example, the computing resources may process the data according to instructions for one or more operations of the application executing as part of the instantiated application-related instance. The application-related instance on the edge computing resources 108 may return, or cause the return of, information relating to a result of processing the data to the UE 105. The UE 105 may use the information in connection with an operation of the application executing on the UE 105.

In some implementations, the UE 105 may transmit one or more data communications, and receive one or more corresponding result communications, during communications with the application-related instance on the computing resources. The communications may conclude when the application terminates on the UE 105, when the UE 105 disconnects from the application-related instance, when a threshold level of inactivity of the application-related instance has been detected, and/or when the application-related instance has existed for a threshold, or predetermined, amount of time. In such cases, the allocation platform 110 may de-allocate the computing resources from the application. For example, the allocation platform 110 may unassign the computing resources from the application, remove (e.g., uninstall, delete, and/or the like) the application-related instance and/or the remote execution file package, close the firewall openings associated with the address assigned to the allocated computing resources, and/or the like. The de-allocated computing resources may then be returned to a shared pool of computing resources for subsequent use in response to future requests.

As shown in FIG. 1C, and by reference number 140, the allocation platform 110 may determine that the UE 105 is entering a coverage area associated with another edge computing resources 108 and thereby exiting a coverage area associated with the current edge computing resources 108. In some implementations, the edge computing resources 108 in the new coverage area may be associated with the current allocation platform 110. In some implementations, the edge computing resources 108 in the new coverage area may be associated with another allocation platform 110 different than the current allocation platform 110. In either case, a "handoff" procedure may be attempted to "move" an ongoing application-related instance (e.g., the application-related instance that has not been terminated) from the current edge computing resources 108 to the new edge computing resources 108.

In some implementations, the allocation platform 110 may communicate with one or more location tracking functions of network 107 to determine whether the UE 105 is entering a coverage area associated with another edge computing resources 108. For example, the allocation platform 110 may communicate, directly or indirectly, with an AMF, MME, or other location tracking facility, to determine whether the UE 105 is entering a coverage area associated with another edge computing resources 108. In some implementations the location of the UE may be provided to the allocation platform 110 upon the occurrence of a triggering event in network 107, such as a handoff of connectivity services between nodes of network 107. The location may be an indication of a new coverage area into which the UE is being (or will soon be) provided communications services, and may include coverage area identification information. In some implementations, the location information may be a geographical location of the UE 105, and the allocation platform 110 may determine the serving coverage area based on geographic boundaries of coverage areas and the location and/or movement of the UE 105 relative to such boundaries. In some implementations, the UE 105 may provide location data (e.g., coverage area identification information, global positioning system (GPS) data, and/or the like) associated with the UE 105 to the allocation platform 110 at regular or irregular intervals to enable the allocation platform 110 to perform the coverage area determination.

In some implementations, the allocation platform 110 may also determine an identity of one or more neighbor edge computing resources 108 and/or allocation platforms 110 and the coverage areas associated therewith. For example, the allocation platform may communicate with facilities within network 107 or other allocation platforms 110 to determine the coverage areas associated with each allocation platform 110 and/or edge computing resources 108.

As shown by reference number 145, the allocation platform 110 may attempt to move the application-related instance to the edge computing resources 108 associated with the new coverage area. In situations where the edge computing resources 108 are associated with a new allocation platform 110, the current allocation platform 110 may transmit a request to the other allocation platform 110 indicating a potential handoff of an ongoing application-related instance to the new edge computing resources 108. In some implementations the request may include information about the UE 105, information about the computing resources currently allocated to the UE 105, the application using the computing resources, and/or the like.

Based on the request, the new allocation platform 110 may determine whether to accept the handoff of the ongoing application-related instance. For example, the new allocation platform 110 may determine whether sufficient resources are currently available in new edge computing resources 108 to accommodate the resource requirements of the application-related instance. In some implementations, the new allocation platform 110 may perform an authorization process to verify that the UE 105, user, and/or application may use resources of new edge computing resources 108. In some implementations, no authorization check may be performed, based on an assumption that the UE 105, user, and/or application is authorized due to the use of current edge computing resources 108.

If the new allocation platform 110 decides to accept the handoff, the new allocation platform 110 may reserve computing resources in new edge computing resources 108, similar to described above. The new allocation platform 100 may send a response message that indicates the acceptance of the handoff. The response may include information that will permit the new edge computing resources 108 and current edge computing resources 108 to perform the transfer. For example, the response may include the address to use to effect the transfer, and the address that may be used by the UE 105 to access the application-related instance at the new edge computing resources 108.

If the new allocation platform 110 determines not to accept the handoff, the response may indicate this refusal. In some implementations, the response may indicate the reason for the refusal. In some implementations, when the new allocation platform 110 determines that the new edge computing resources 108 do not have sufficient available computing resources to receive the application-related instance, an indication thereof may be provided in the response. In some implementations, the current allocation platform 110 may request waitlisting at the new allocation platform 110 and notification when resources become available. In such cases, the current allocation platform 110 may delay termination of the application-related instance to permit continued processing using the current edge computing resources allocated by the current allocation platform 110.

In some implementations, the initial request from the current allocation platform 110 to the new allocation platform 110 may include a request to report on available computing resources associated with the new edge computing resources 108, such that the current allocation platform 110 may determine if a transfer of the application-related instance is possible. The new allocation platform 110 may respond with the available resources at new edge computing resources 108. If the available resources will meet the requirements of the application-related instance, the current allocation platform 110 may transmit a request to the new allocation platform 110 to reserve the computing resources for the application on new edge computing resources 108. If the available resources will not meet the requirements of the application-related instance, the current allocation platform 110 may request allocation of computing resources by new allocation platform 110 once the computing resources become available.

In implementations where the same allocation platform 110 is associated with the current and new edge computing resources 108, certain communications described above may be omitted and may be determined within the current allocation platform 110 (e.g., whether sufficient computing resources are available to be allocated in the new edge computing resources 108).

Where handoff of the application-related instance has been accepted, a transfer of the application-related instance from the current edge computing resources 108 to the new edge computing resources 108 is performed. The handoff may be effected by various methods. For example, a "configuration" of the application-related instance may be collected and transferred to the new edge computing resources 108. The configuration may include the remote execution file package (e.g., a copy of the file package) received in the request from the UE 105. In some implementations, the configuration may include an image file of the application-related instance at a time of transfer from the current edge computing resources 108 to the new edge computing resources 108. In some implementations, the configuration may include information identifying a state of the application-related instance, a state of an operation of the application, and/or the like, at a time of transfer from the current edge computing resources 108 to the new edge computing resources 108. The time of transfer may be a time when the current allocation platform 110 freezes or terminates the execution of the application-related instance at the current edge computing resources 108 in preparation for transfer to the new edge computing resources 108.

In some implementations, the current allocation platform 110, prior to transmitting the configuration, may transmit a request to the UE 105 to provide an image file of the application, information identifying a state of the application, information identifying a state of an operation of the application, and/or the like. The UE 105 may respond to the request (e.g., via an API), and the current allocation platform 110 may include file(s) and/or information received in the response in the configuration transmitted to the new edge computing resources 108.

Additionally, the configuration may include the authentication data associated with the application (e.g., received in the request from the UE) or information indicating that the application, the UE 105, and/or a user associated with either, has been previously authenticated. Furthermore, the configuration may include information identifying a quantity of computing resources, a type of computing resources, an operating system, and/or the like, as received in the request from the UE 105. The configuration also may include data received from the UE 105 that is awaiting processing.

In some implementations, the current allocation platform 110 may transmit, prior to the time of transfer, a first configuration identifying information received in the request from the UE 105 (e.g., a file package, a quantity of computing resources, a type of computing resources, an operating system, authentication data, and/or the like) to permit the new allocation platform 110 to perform initial provisioning tasks. Accordingly, the current allocation platform 110 may transmit a second configuration that includes an image file of the application-related instance, information identifying a state of the application-relation instance, information identifying a state of an operation of the application, and/or the like, at the time of transfer.

Upon receiving the configuration, the new allocation platform 110 may allocate computing resources for the application-related instance (if not already done), as described in more detail above (e.g., resource allocation, address assignment, firewall configuration). The new allocation platform 110 may instantiate the application-related instance on new edge computing resources 108. How such instantiation occurs will depend on what form of configuration is provided. For example, instantiation may include installation of code associated with the remote execution file package for execution by the computing resources and execution of the code using the computing resources. Instantiation may include loading of an image file of the state of the application-related instance at the time of transfer from the current edge computing resources 108. Moreover, the current allocation platform 110 may de-allocate the computing resources from the application, as described in more detail above.

In some implementations, the current allocation platform 110 may have already provided the UE 105 with a notification of the transfer and new addressing information for the application-related instance at the new edge computing resources 108. The UE 105 may update addressing information of the UE 105 and use the new addressing information to access the application-related instance at the new edge computing resources 108.

In some implementations, as shown by reference number 150, the UE 105 may transmit, and the new allocation platform 110 may receive, a request (e.g., an API request) to enable access to the application-related instance on the new edge computing resources 108. The request may include information that identifies the UE 105 and/or the application, but may omit the file package, the authentication data, and/or information identifying a quantity of computing resources, a type of computing resources, and/or the like. In some implementations, the request may include an image file of the application, information identifying a state of the application, information identifying a state of an operation of the application, and/or the like, at a time of the request, at a previous time point, and/or the like.

The UE 105 may transmit the request based on a determination that the UE 105 has established a connection within a new network coverage area associated with the new allocation platform 110. For example, the UE 105 may transmit the request based on a determination that there has been a change to a serving cell of the UE 105 (e.g., based on a change to an IP address assigned to the UE 105, based on a change to a radio frequency on which the UE 105 is communicating, and/or the like). The UE 105 may transmit the request to the anycast address associated with the service. In this way, the request will be processed by the new allocation platform 110, as described above, without the UE 105 having particular knowledge of an identity of the new allocation platform 110.

As shown by reference number 155, the new allocation platform 110 may transmit, and the UE 105 may receive, a response indicating that the computing resources have been allocated to the application, as described in more detail above. For example, the response may identify the address/port at which the UE 105 is to access the application-related instance on the computing resources. Based on the response, the UE 105 may establish a communication connection with the application-related instance on the computing resources, as described in more detail above.

The edge computing system described above allows for the use of edge computing resources without the need to preconfigure the application operations in the edge computing system. Application-related operations using the edge computing resources can be deployed on-demand by UEs based on the capabilities of individual applications. The edge computing system can still limit access based on UEs, users, and/or applications, as well as available resources.

As indicated above, FIGS. 1A-1C are provided as one or more examples. Other examples may differ from what is described with regard to FIGS. 1A-1C. Moreover, the quantity and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
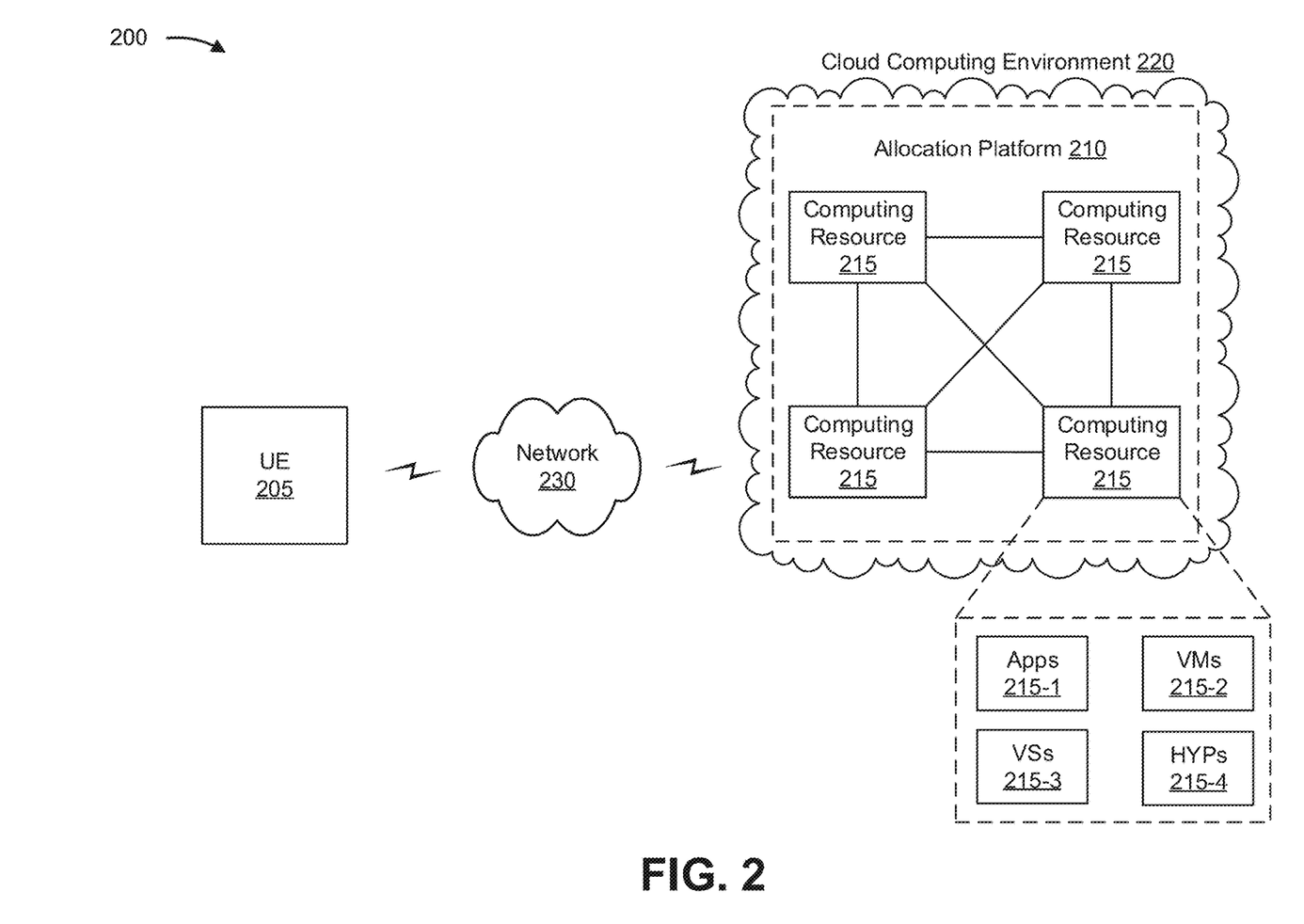
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 205, an allocation platform 210, a computing resource 215, a cloud computing environment 220, and a network 230. Devices of environment 200 may interconnect via wired connections, wireless connections, or a combination of wired and wireless connections.

UE 205 may include one or more devices capable of communicating with a base station and/or a network (e.g., network 230). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 205 may be capable of communicating using uplink (e.g., UE to base station) communications, downlink (e.g., base station to UE) communications, and/or sidelink (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like.

Allocation platform 210 includes, or is associated with, one or more computing resources that may be allocated to UE 205. For example, allocation platform 210 may be a platform implemented by cloud computing environment 220 that may facilitate cloud computing for the UE 205. In some implementations, allocation platform 210 is implemented by computing resources 215 of cloud computing environment 220.

Allocation platform 210 may include a server device or a group of server devices. In some implementations, allocation platform 210 may be hosted in cloud computing environment 220. Notably, while implementations described herein may describe allocation platform 210 as being hosted in cloud computing environment 220, in some implementations, allocation platform 210 may be non-cloud-based or may be partially cloud-based.

Cloud computing environment 220 includes an environment that delivers computing as a service, whereby shared resources, services, and/or the like may be provided to UE 205. Cloud computing environment 220 may provide computation, software, data access, storage, and/or other services that do not require end-user knowledge of a physical location and configuration of a system and/or a device that delivers the services. In some implementations, cloud computing environment 220 may include a MEC cloud computing environment. For example, cloud computing environment 220 may be associated with one or more nodes of a radio access network of network 230. As shown, cloud computing environment 220 may include computing resources 215.

Computing resource 215 includes one or more personal computers, workstation computers, server devices, or another type of computation and/or communication device. In some implementations, computing resource 215 may host allocation platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications or application components (e.g., libraries, microservices, and/or the like) that may be provided to or accessed by UE 205. Application 215-1 may eliminate a need to install and execute all or a portion of the software applications on UE 205. For example, application 215-1 may include software associated with allocation platform 210 and/or any other software capable of being provided via cloud computing environment 220. In some implementations, one application 215-1 may send/receive information to/from one or more other applications 215-1, via virtual machine 215-2. In some implementations, application 215-1 may be an application-related instance resulting from installation of code associated with a remote execution file package provided by UE 205.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., UE 205), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
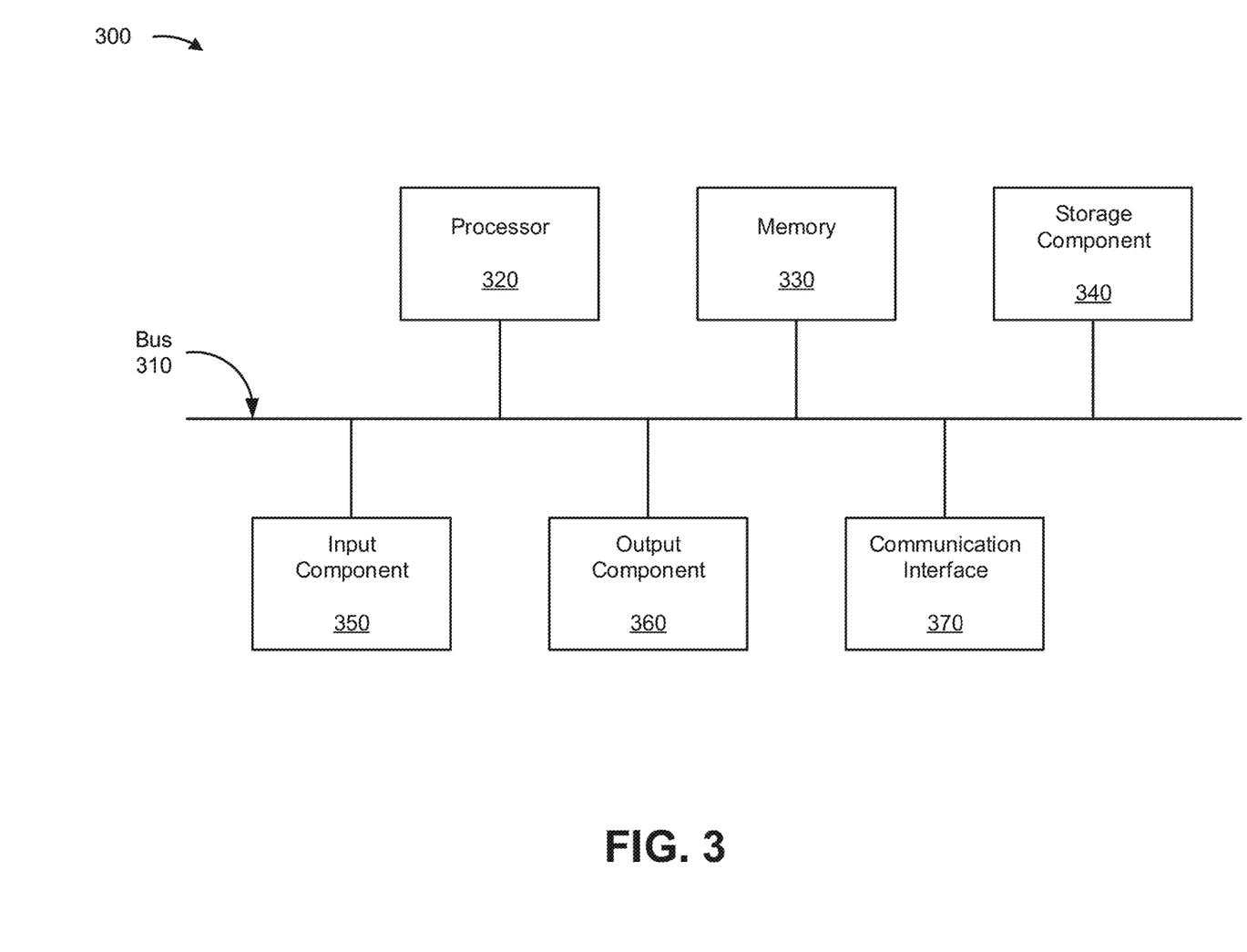
FIG. 3 is a diagram of example components of one or more devices of FIG. 2.

FIG. 3 is a diagram of example components of a device 300. Device 300 may correspond to UE 205, allocation platform 210, and/or computing resource 215. In some implementations UE 205, allocation platform 210, and/or computing resource 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
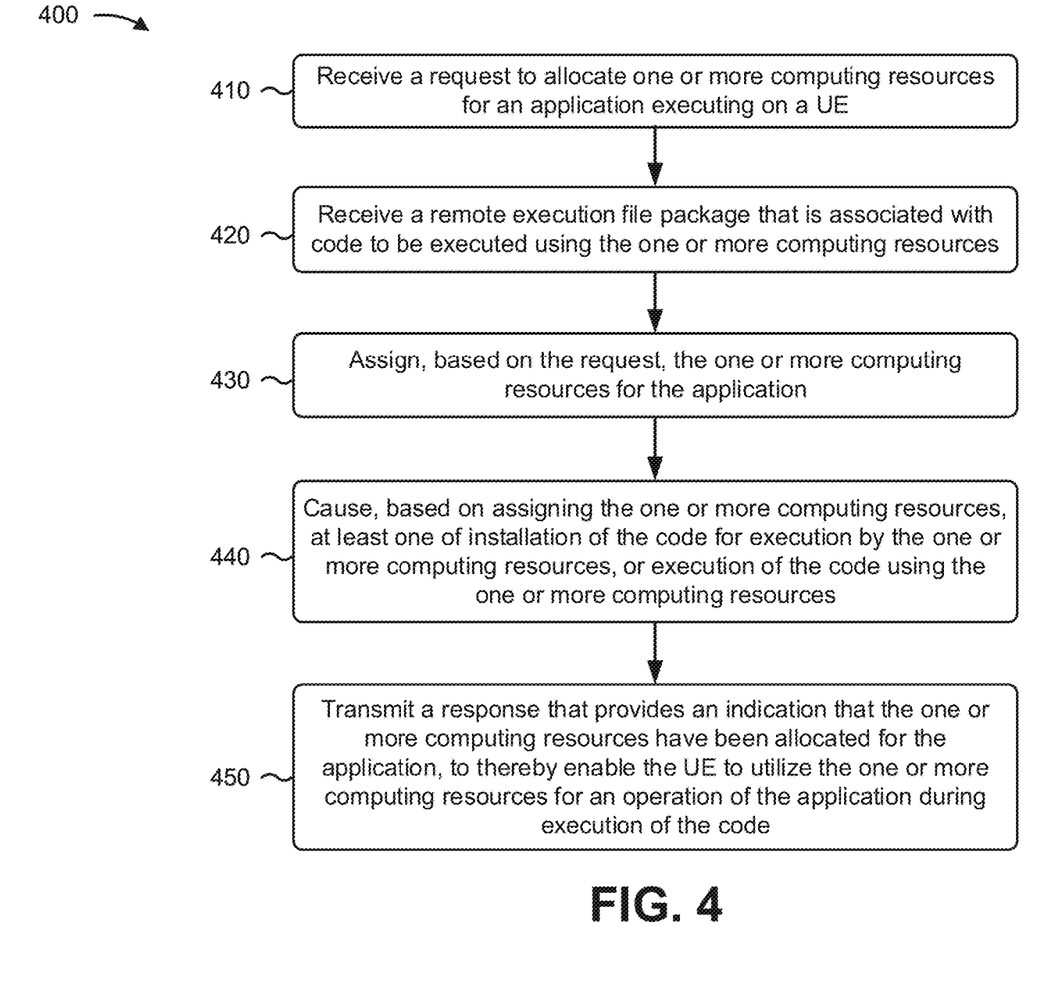
FIG. 4 is a flow chart of an example process for low latency cloud computing.

FIG. 4 is a flow chart of an example process 400 for low latency cloud computing. In some implementations, one or more process blocks of FIG. 4 may be performed by an allocation platform (e.g., allocation platform 110). In some implementations, one or more process blocks of FIG. 4 may be performed by another device or a group of devices separate from or including the allocation platform, such as a UE (e.g., 205), a computing resource (e.g., computing resource 215), and/or the like.

As shown in FIG. 4, process 400 may include receiving a request to allocate one or more computing resources for an application executing on a UE (block 410). For example, the allocation platform (e.g., using processor 320, input component 350, communication interface 370, and/or the like) may receive a request to allocate one or more computing resources for an application executing on the UE, as described above. Receiving the request may be via an application programming interface. In some implementations, the request may include a remote execution file package including code, or other elements, to be used to execute operations of the application using the computing resources.

In some implementations, execution of the code associated with the remote execution file package may provide an operation of the application. Alternatively, execution of the file package may cause retrieval of another file or files, and execution of the other file(s) provides an operation of the application.

The allocation platform may be associated with an edge node of a mobile network, and the UE may be within a coverage area associated with the edge node. The edge node may be a node of a radio access network of the mobile network. In some implementations, the allocation platform may be reachable at an anycast address.

In some implementations, the request further includes information identifying at least one of a quantity of the one or more computing resources that are to be allocated for the application or a type of the one or more computing resources that are to be allocated for the application. For example, the computing resources may be associated with at least one of a central processing unit or a graphics processing unit.

In some implementations, process 400 further includes processing authentication data included in the request to determine whether to allow the request.

As further shown in FIG. 4, process 400 may include receiving a remote execution file package that is associated with code to be executed using the one or more computing resources (block 420). For example, the allocation platform (e.g., using processor 320, input component 350, communication interface 370, and/or the like) may receive a remote execution file package that is associated with code to be executed using the one or more computing resources, as described above.

As further shown in FIG. 4, process 400 may include assigning, based on the request, the one or more computing resources for the application (block 430). For example, the allocation platform (e.g., using processor 320, memory 330, storage component 340, and/or the like) may assign, based on the request, the one or more computing resources for the application, as described above.

Process 400 may further include configuring a firewall to allow the application to access the computing resources during execution of the code associated with the file package. In some implementations, process 400 further includes assigning an address at which the computing resources may be accessed during execution of the code associated with the file package.

As further shown in FIG. 4, process 400 may include causing, based on assigning the one or more computing resources, at least one of installation of the code for execution by the one or more computing resources, or execution of the code using the one or more computing resources (block 440). For example, the allocation platform (e.g., using processor 320, memory 330, storage component 340, and/or the like) may cause, based on assigning the one or more computing resources, at least one of installation of the code associated with the file package for execution by the one or more computing resources, or execution of the code associated with the file package using the one or more computing resources, as described above. In some implementations, the at least one of installation of the code or execution of the code may be caused while the application is executing on the UE.

As further shown in FIG. 4, process 400 may include transmitting a response that provides an indication that the one or more computing resources have been allocated for the application, to thereby enable the UE to utilize the one or more computing resources for an operation of the application during execution of the code (block 450). For example, the allocation platform (e.g., using processor 320, output component 360, communication interface 370, and/or the like) may transmit a response that provides an indication that the one or more computing resources have been allocated for the application, to thereby enable the UE to utilize the one or more computing resources for an operation of the application during execution of the code, as described above.

Transmitting the response may be via an application programming interface. In addition, the response may identify an address at which the application-related instance executing using the computing resources is to be accessed.

In some implementations, process 400 further includes determining that the UE is entering another coverage area associated with another edge node, and transmitting a configuration of the application-related instance to another device associated with the other edge node, to thereby enable the other device to allocate another one or more computing resources, that are to execute another application-related instance, for the application. In some implementations, the allocation platform and the other device are reachable at a same address.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a device and from a user equipment (UE), a request to allocate one or more computing resources for an application executing on the UE without prior configuration of the one or more computing resources for use by the application,
  wherein the device is associated with an edge node of a mobile network and the UE is within a coverage area associated with the edge node
 receiving, by the device and from the UE, a remote execution file package that is associated with code to be executed using the one or more computing resources,
  wherein execution of the code provides operation of the application, wherein the remote execution file package, which comprises one or more executable files, causes creation of an instance related to the application,
wherein the instance is configured to run within the one or more computing resources, and
wherein the instance includes one or more operations of the application;
assigning, by the device and based on the request, the one or more computing resources for the application;
causing, by the device and based on assigning the one or more computing resources, at least one of:
installation of the code for execution by the one or more computing resources, or
execution of the code using the one or more computing resources; and
transmitting, by the device, a response that provides an indication that the one or more computing resources have been allocated for the application, to thereby enable the UE to utilize the one or more computing resources for the operation of the application during execution of the code.

2. The method of claim 1, wherein the computing resources are associated with at least one of a central processing unit or a graphics processing unit.

3. The method of claim 1, wherein the at least one of installation of the code or execution of the code is caused while the application is executing on the UE.

4. The method of claim 1, wherein the response identifies an address at which the instance is to be accessed.

5. The method of claim 1, further comprising:
configuring a firewall to allow the application to access the one or more computing resources during execution of the code.

6. The method of claim 1, further comprising:
determining that the UE is entering another coverage area associated with another edge node; and
transmitting a configuration of the instance to another device associated with the other edge node, to thereby enable the other device to allocate another one or more computing resources, that are to execute another application-related instance, for the application.

7. The method of claim 1, wherein the remote execution file package is provided with the request.

8. An edge computing device, comprising:
one or more memories; and
one or more processors communicatively coupled to the one or more memories, configured to:
receive, from a user equipment (UE) within a coverage area associated with the edge computing device, a request to allocate one or more computing resources for an application executing on the UE without prior configuration of the one or more computing resources for use by the application
receive, from the UE, a remote execution file package that is associated with code to be executed using the one or more computing resources,
wherein the remote execution file package, which comprises one or more executable files, causes creation of an application-related instance that is configured to run within the one or more computing resources, and
wherein the instance includes one or more operations of the application;
allocate, based on the request, the one or more computing resources for the application,
wherein the one or more computing resources allocated are to execute the code to cause instantiation of the application-related instance;
determine that the UE is entering another coverage area associated with another edge computing device; and
transmit a configuration of the application-related instance to the other edge computing device, to thereby enable the other edge computing device to allocate another one or more computing resources, that are to instantiate another application-related instance according to the configuration, for the application.

9. The edge computing device of claim 8, wherein the edge computing device and the other edge computing device are reachable at a same address.

10. The edge computing device of claim 8, wherein the edge computing device is associated with a node of a radio access network of a mobile network, and the coverage area is associated with the node.

11. The edge computing device of claim 8, wherein the request further includes information identifying at least one of a quantity of the one or more computing resources that are to be allocated for the application or a type of the one or more computing resources that are to be allocated for the application.

12. The edge computing device of claim 8, wherein the one or more processors, when allocating the one or more computing resources, are configured to at least one of:
install the code for execution by the one or more computing resources, or
execute the code using the one or more computing resources.

13. The edge computing device of claim 8, wherein execution of the code provides an operation of the application.

14. The edge computing device of claim 8, wherein execution of the code causes retrieval of another remote execution file package that is associated with additional code to be executed using the one or more computing resources, and
wherein execution of the additional code provides an operation of the application.

15. A non-transitory computer-readable medium storing instructions, the instructions comprising:
one or more instructions that, when executed by one or more processors, cause the one or more processors to:
receive, from a user equipment (UE) within a coverage area of an edge computing device, a request to allocate one or more computing resources for an application executing on the UE without prior configuration of the one or more computing resources for use by the application
receive, from the UE, a remote execution file package that is associated with code to be executed using the one or more computing resources,
wherein the remote execution file package, which comprises one or more executable files, causes creation of an instance related to the application that is configured to run within the one or more computing resources, and
wherein the instance includes one or more operations of the application;
assign, based on the request, the one or more computing resources for the application;
cause, based on assigning the one or more computing resources, at least one of:

installation of the code for execution by the one or more computing resources, or execution of the code using the one or more computing resources;

assign an address at which the instance is to be accessed during execution of the code; and transmit, to the UE, a response that identifies the address, to thereby enable the UE to utilize the one or more computing resources for operation of the application during execution of the code.

16. The non-transitory computer-readable medium of claim 15, wherein the edge computing device is reachable at an anycast address.

17. The non-transitory computer-readable medium of claim 15, wherein receiving the request and transmitting the response are via an application programming interface.

18. The non-transitory computer-readable medium of claim 15, wherein the one or more instructions, when executed by the one or more processors, further cause the one or more processors to:

process authentication data included in the request to determine whether to allow the request.

19. The non-transitory computer-readable medium of claim 15, wherein the one or more instructions, when executed by the one or more processors, further cause the one or more processors to:

configure a firewall to allow the application to access the one or more computing resources during execution of the code.

20. The non-transitory computer-readable medium of claim 15, wherein the one or more instructions, when executed by the one or more processors, further cause the one or more processors to:

determine that the UE is entering another coverage area associated with another edge computing device; and transmit a configuration of the instance to the other edge computing device, to thereby enable the other edge computing device to allocate another one or more computing resources, that are to instantiate another application-related instance according to the configuration, for the application.

* * * * *